United States Patent
Terada et al.

(10) Patent No.: US 9,689,289 B2
(45) Date of Patent: Jun. 27, 2017

(54) ENGINE-EXHAUST-SYSTEM APPARATUS AND PACKAGE-TYPE ENGINE ELECTRIC POWER GENERATOR

(71) Applicant: YANMAR CO., LTD., Osaka (JP)

(72) Inventors: Ruriko Terada, Osaka (JP); Susumu Murai, Osaka (JP); Tatsuya Kawano, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 14/768,867

(22) PCT Filed: Dec. 25, 2013

(86) PCT No.: PCT/JP2013/084691
§ 371 (c)(1),
(2) Date: Aug. 19, 2015

(87) PCT Pub. No.: WO2014/147916
PCT Pub. Date: Sep. 25, 2014

(65) Prior Publication Data
US 2016/0003116 A1    Jan. 7, 2016

(30) Foreign Application Priority Data

Mar. 21, 2013 (JP) ................. 2013-058230

(51) Int. Cl.
*F01N 1/02* (2006.01)
*F01N 13/18* (2010.01)
(Continued)

(52) U.S. Cl.
CPC ............ *F01N 1/02* (2013.01); *F01N 1/083* (2013.01); *F01N 1/084* (2013.01); *F01N 1/089* (2013.01);
(Continued)

(58) Field of Classification Search
CPC . F01N 1/02; F01N 1/083; F01N 1/084; F01N 1/089; F01N 13/1872; F01N 3/005;
(Continued)

(56) References Cited

U.S. PATENT DOCUMENTS 4,971,166 A * 11/1990 Hase .................. F01N 1/02
181/254
6,260,659 B1   7/2001 Takahashi et al.
7,193,333 B1 * 3/2007 Kitch ................ F02B 63/04
123/2

FOREIGN PATENT DOCUMENTS

JP        58-27049 U    6/1983
JP     2002-332837 A    11/2002
(Continued)

OTHER PUBLICATIONS

Machine Translation of JP 2005240703 A (UNO).*
(Continued)

*Primary Examiner* — Mark A Laurenzi
*Assistant Examiner* — Brandon Lee
(74) *Attorney, Agent, or Firm* — Locke Lord LLP; Howard M. Gitten (57) ABSTRACT

An engine-exhaust-system apparatus includes: a main body that reduces noise generated by exhaust gas; and an exhaust outlet tube that includes an insertion section inserted into the main body, exhaust gas in the main body being discharged outside via the exhaust outlet tube, wherein the insertion section has an open end with a brim portion that spreads beyond a tube diameter of the insertion section.

2 Claims, 9 Drawing Sheets (51) Int. Cl.
*F01N 1/08* (2006.01)
*F01N 3/00* (2006.01)

(52) U.S. Cl.
CPC ......... *F01N 3/005* (2013.01); *F01N 13/1872* (2013.01); *F01N 2470/18* (2013.01); *F01N 2490/02* (2013.01); *F01N 2490/06* (2013.01); *F01N 2590/10* (2013.01); *Y02T 10/20* (2013.01)

(58) Field of Classification Search
CPC ............ F01N 2470/18; F01N 2490/02; F01N 2490/06; F01N 2590/10; Y02T 10/20
See application file for complete search history.

(56) References Cited

FOREIGN PATENT DOCUMENTS

| | | | |
|---|---|---|---|
| JP | 2005240703 A | * | 9/2005 |
| JP | 4746572 B2 | | 8/2011 |

OTHER PUBLICATIONS

Supplementary European Search Report dated Feb. 5, 2016, issued for the corresponding European patent application No. 13878617.3.
International Search Report mailed Apr. 1, 2014, issued for PCT/JP2013/084691.

\* cited by examiner

FIG.10

ENGINE-EXHAUST-SYSTEM APPARATUS AND PACKAGE-TYPE ENGINE ELECTRIC POWER GENERATOR

TECHNICAL FIELD

The present invention relates to an engine-exhaust-system apparatus and a package-type engine electric power generator disposed on the exhaust path of, for example, a stationary engine.

BACKGROUND ART

Figure 10:
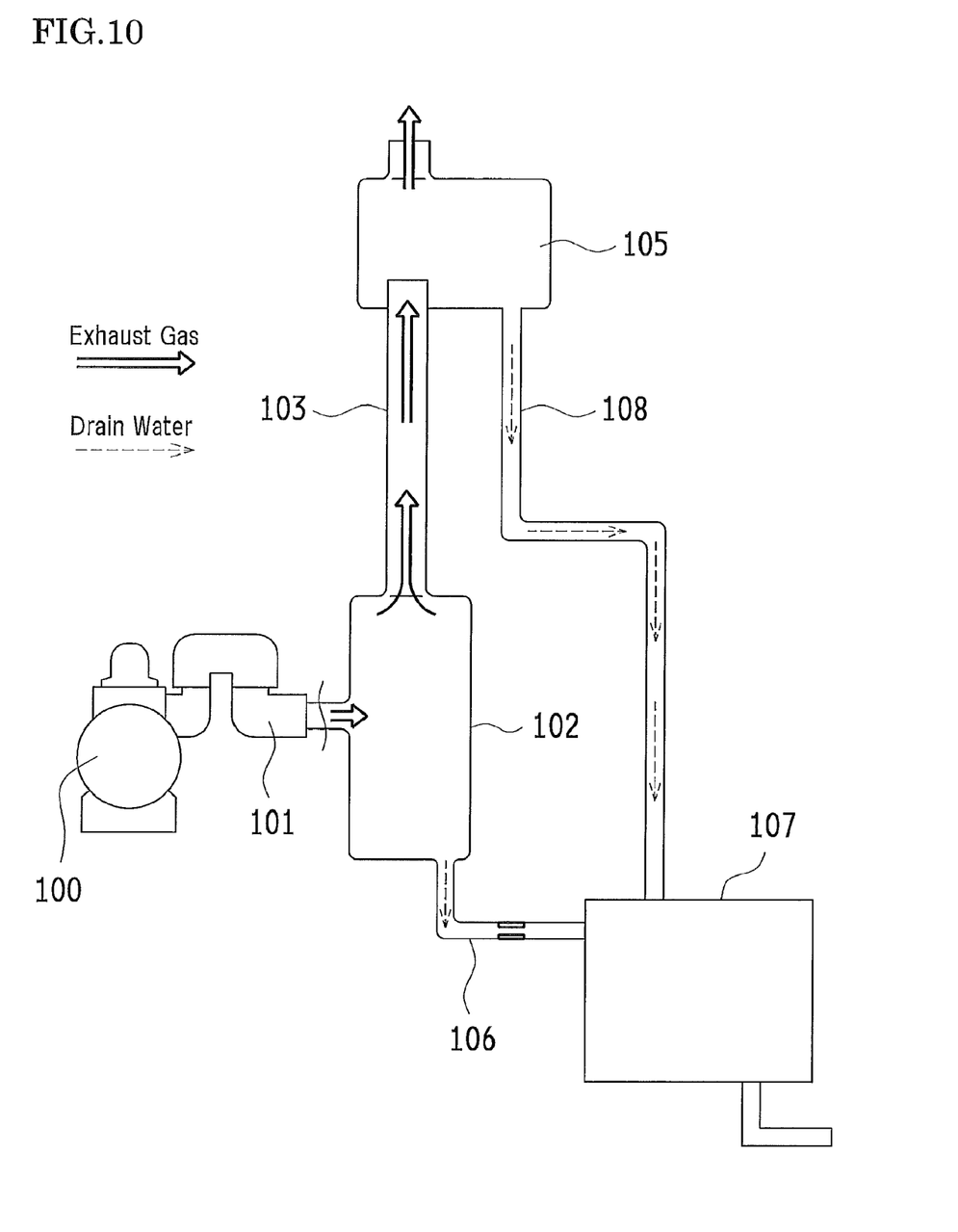
FIG. 10 is a schematic view of a conventional example.

Engine exhaust structures are conventionally known that include a muffler and a mist separator (gas-liquid separator) on the exhaust path of a stationary engine (see, for example, Patent Document 1). The engine exhaust structure described in Patent Document 1 includes a muffler 102, a mist separator 105, a drain filter 107, and a drain water recovering tube 108 as illustrated in FIG. 10. The muffler 102 is spatially continuous with an exhaust gas hose 101 of the engine 100. The mist separator 105 is spatially continuous with the muffler 102 via an exhaust gas pipe 103. The drain filter 107 is spatially continuous with the muffler 102 via a muffler drain tube 106. The drain water recovering tube 108 is spatially continuous with the drain filter 107 and the mist separator 105.

In this structure, the exhaust gas that rises from the muffler 102 via the exhaust gas pipe 103 is released outside after the exhaust gas is rid of water in the mist separator 105. The mist separator 105 accumulates the removed water (condensed water). The condensed water accumulated in the mist separator 105 is recovered in the drain filter 107 via the drain water recovering tube 108.

Another known engine exhaust structure includes a mist separator that is modified for improved capability of capturing condensed water in the exhaust gas (see, for example, Patent Document 2). Patent Document 2 discloses a structure where the exhaust outlet tube has a downstream end thereof inserted into the mist separator and also has an insertion section on which there is provided a groove section that curves outward.

CITATION LIST

Patent Literature

Patent Document 1: Japanese Patent Application Publication, Tokukai, No. 2002-332837
Patent Document 2: Japanese Patent No. 4746572

SUMMARY OF THE INVENTION

Problems to Be Solved by the Invention

Patent Document 1 discloses an device that includes a muffler 102 and a mist separator 105. The muffler 102 has a sound deadening function that reduces the noise generated by exhaust gas. The mist separator 105 has an exhaust gas-liquid separating function. The muffler 102 has no active gas-liquid separating function.

In the mist separator of Patent Document 2, the exhaust outlet tube has a curved groove section so that the water condensing on the inner wall face of the exhaust outlet tube can be caught in the groove section. Water may condense also on the outer face of the insertion section, of the exhaust outlet tube, that is inserted into the mist separator. This condensed water would run downward on the outer face of the insertion section and is sucked into the exhaust outlet tube together with exhaust gas. The mist separator of Patent Document 2 is not capable of preventing the water condensing on the outer face of the insertion section of the exhaust outlet tube from being sucked into the exhaust outlet tube.

The gas duct (path) of an exhaust system is usually cool, especially, when engine operation is suspended and later resumed after a predetermined time. Immediately after the operation is resumed, the water content of exhaust gas could condense in the cool gas duct of the exhaust system and collect on the outer face of the insertion section of the exhaust outlet tube. When this is actually the case, the condensed water would run downward on the outer face of the insertion section and might be sucked too rapidly into the exhaust outlet tube together with the exhaust gas.

In view of the prior art, the present invention has an object of providing an engine-exhaust-system apparatus and an associated package-type engine electric power generator that have, in addition to a sound deadening function, a gas-liquid separating function to prevent the water content on the outer face of the insertion section of the exhaust outlet tube from being sucked into the exhaust outlet tube together with the exhaust gas.

Solution to Problem

The present invention, conceived to achieve the object, is an engine-exhaust-system apparatus including: a main body that reduces noise generated by exhaust gas; and an exhaust outlet tube that includes an insertion section inserted into the main body, exhaust gas in the main body being discharged outside via the exhaust outlet tube, wherein the main body is internally separated by a partition wall into an exhaust outlet chamber where the exhaust outlet tube is disposed and an exhaust inlet chamber where an exhaust tube is disposed that connects the engine-exhaust-system apparatus to an exhaust discharge port side of an engine, there is provided a distribution tube that spatially connects the exhaust outlet chamber and the exhaust inlet chamber, the exhaust outlet tube is disposed parallel to an axis of the distribution tube and displaced radially relative to the distribution tube, and the insertion section has an open end with a brim portion that spreads beyond a tube diameter of the insertion section, the brim portion being disposed along a peripheral wall at the open end.

According to the present invention, if the water condensing on the outer face of the insertion section of the exhaust outlet tube runs downward on the outer face of the insertion section of the exhaust outlet tube upon engine startup, the condensed water flows outward on the brim portion along the radii of the exhaust outlet tube (i.e., in a direction moving away from the open end of the insertion section). The structure therefore is capable of restraining the water condensing on the outer face of the insertion section of the exhaust outlet tube from running downward on the outer face of the insertion section of the exhaust outlet tube and being sucked into the exhaust outlet tube from the open end before being discharged. The structure hence eliminates the need to separately provide a conventional mist separator on the exhaust path of a stationary engine.

The present invention is a package-type engine electric power generator including an engine and an electric power generator in a single package and further including the engine-exhaust-system apparatus described above.

According to the present invention, either one of the exhaust muffler or the mist separator (e.g., the mist separator) does not need to be separately provided as opposed to the cases where both the exhaust muffler and the mist separator need to be provided. The structure advantageously allows for reduction in the internal space required with the package and also reduction in the number of components of the package.

Advantageous Effects of the Invention

The present invention can prevent condensed water from running downward on the outer face of the insertion section of the exhaust outlet tube and being sucked into the exhaust outlet tube from the open end. The present invention hence eliminates the need to separately provide a mist separator on the exhaust path of a stationary engine.

DESCRIPTION OF EMBODIMENTS

The following will describe embodiments of the present invention in reference to drawings.

The present embodiment will describe the present invention being applied to a cogenerator 1 that includes a package-type engine electric power generator. The cogenerator 1 is a system that connects both a commercial electric power system as an external commercial power supply and the power generation system of an electric power generator to a power transmission system for an electrically powered device (load), so as to meet demand by the load for electric power, and that also recovers exhaust heat, a by-product of electric power generation, to utilize the recovered heat.

Figure 1:
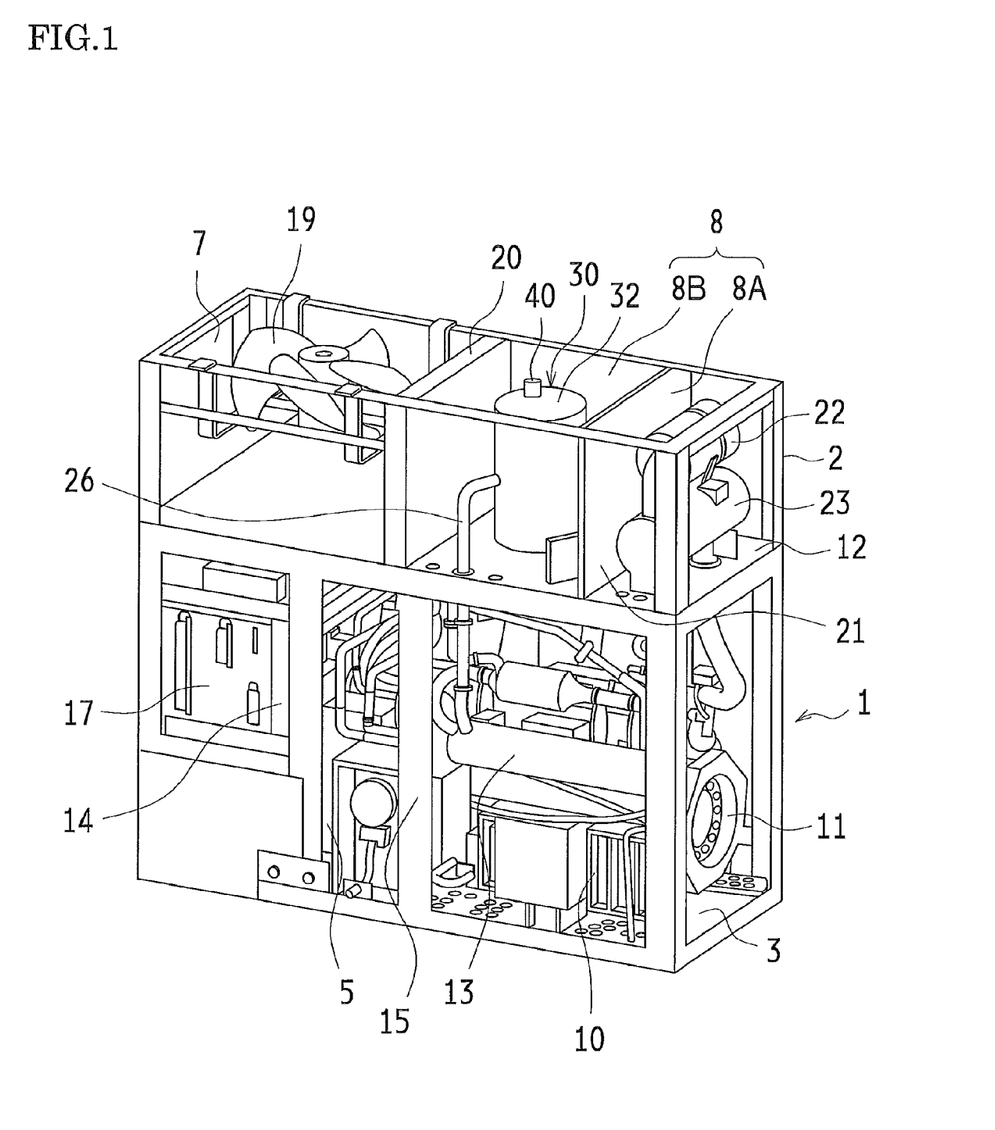
FIG. 1 is a schematic oblique view of a whole cogenerator in accordance with an embodiment of the present invention.

FIG. 1 is a schematic oblique view of the whole cogenerator 1. As illustrated in FIG. 1, the cogenerator 1 in accordance with the present embodiment includes a substantially rectangular parallelepiped package 2 as a housing. The interior of the package 2 is divided into two (top and bottom) parts by a middle stage wall 12 located substantially halfway up from the bottom of the package 2. The bottom part contains an engine chamber 3 and a device housing chamber 5. The top part contains a radiator chamber 7 and an intake air/exhaust gas chamber 8. In FIG. 1, the package 2 is shown with some components, such as an open/close door and outer walls, being omitted so that the internal structure is visible.

The engine chamber 3 is disposed near one of lengthwise ends of the package 2. The engine chamber 3 contains, among others, an engine 10, an electric power generator 11, an exhaust heat exchanger 13, a cool water pump (not shown), and a water-to-water heat exchanger (not shown). The electric power generator 11 is powered by the engine 10. The engine 10 may be, for example, a gas engine and started up by a mixer mixing fuel gas and air. The electric power generator 11 works (rotates) when driven by the engine 10.

The device housing chamber 5 is located beside the engine chamber 3 (to the left of the engine chamber 3 in FIG. 1). The device housing chamber 5 is separated from the engine chamber 3 by a partition wall 15. The device housing chamber 5 contains, among others, a control box 17 and an inverter 14. The control box 17 includes, for example, a control device that controls engine-drive-system devices and water-to-water heat-exchange-system devices.

The radiator chamber 7 is located above the device housing chamber 5 and diagonally opposite (obliquely above) the engine chamber 3 in the package 2. The radiator chamber 7 contains a radiator (not shown) and a heat-discharging radiator fan 19. The radiator fan 19, located on top of the radiator chamber 7, is driven under the control of the control device.

The radiator chamber 7 and the intake air/exhaust gas chamber 8 are separated by a partition wall 20 made from, for example, a metal plate. The intake air/exhaust gas chamber 8 is divided into an intake air chamber 8A and an exhaust gas chamber 8B by a partition wall 21 made from, for example, a metal plate.

There is provided a vent (not shown) for the engine chamber 3 through the part of the middle stage wall 12 that corresponds to the bottom of the exhaust gas chamber 8B. Exhaust from the engine chamber flows through the vent into the exhaust gas chamber 8B and then through a vent opened in the partition wall 20 into the radiator chamber 7. In contrast, the partition wall 21 has no vent opened therethrough, so that the intake air chamber 8A and the exhaust gas chamber 8B do not exchange fresh air or exhaust gas with each other.

The intake air chamber 8A contains an air cleaner 22 and an intake air silencer 23. The exhaust gas chamber 8B contains an exhaust muffler 30 as an engine-exhaust-system apparatus.

Figure 2:
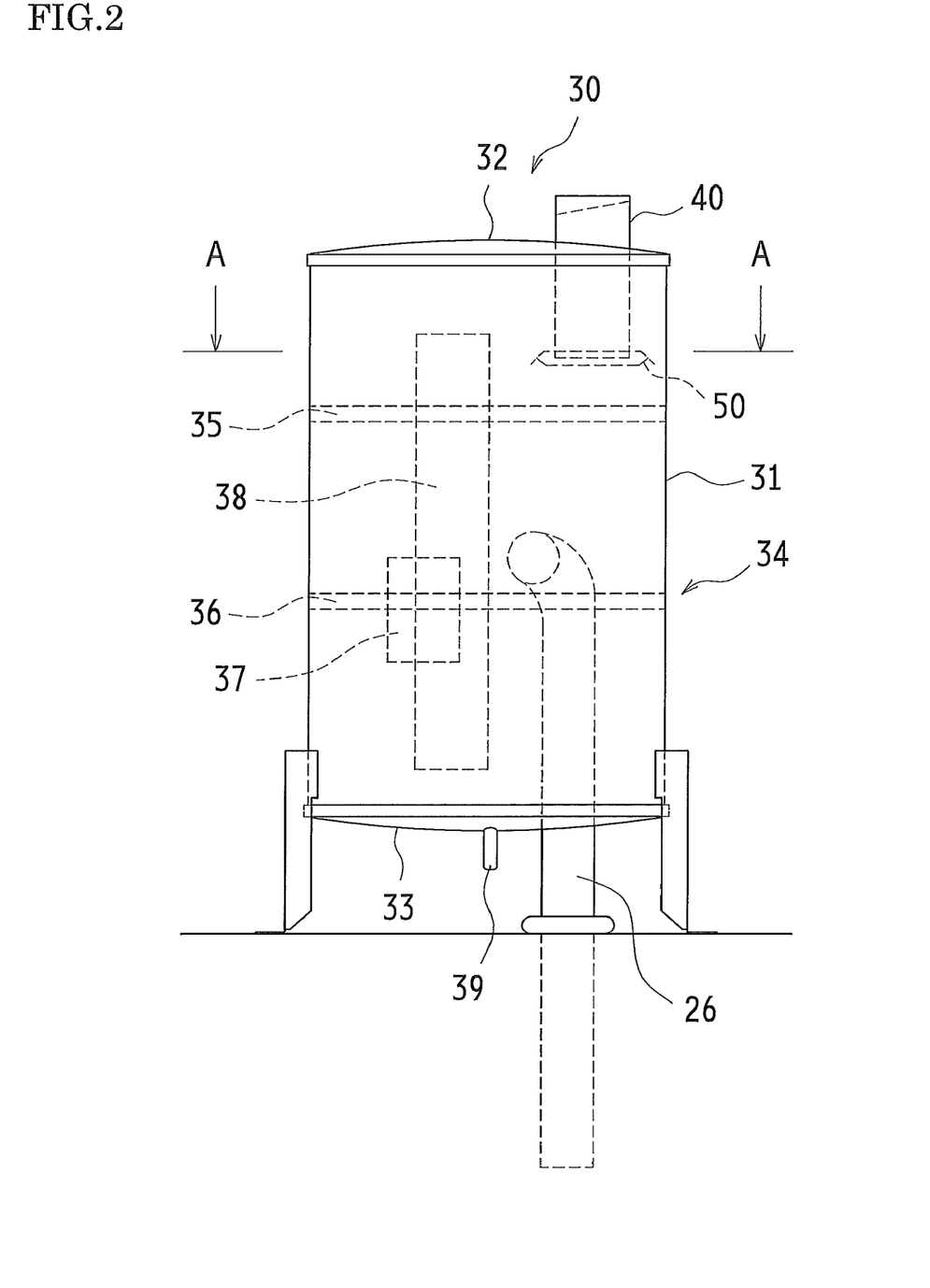
FIG. 2 is a front view of an exhaust muffler.
Figure 3:
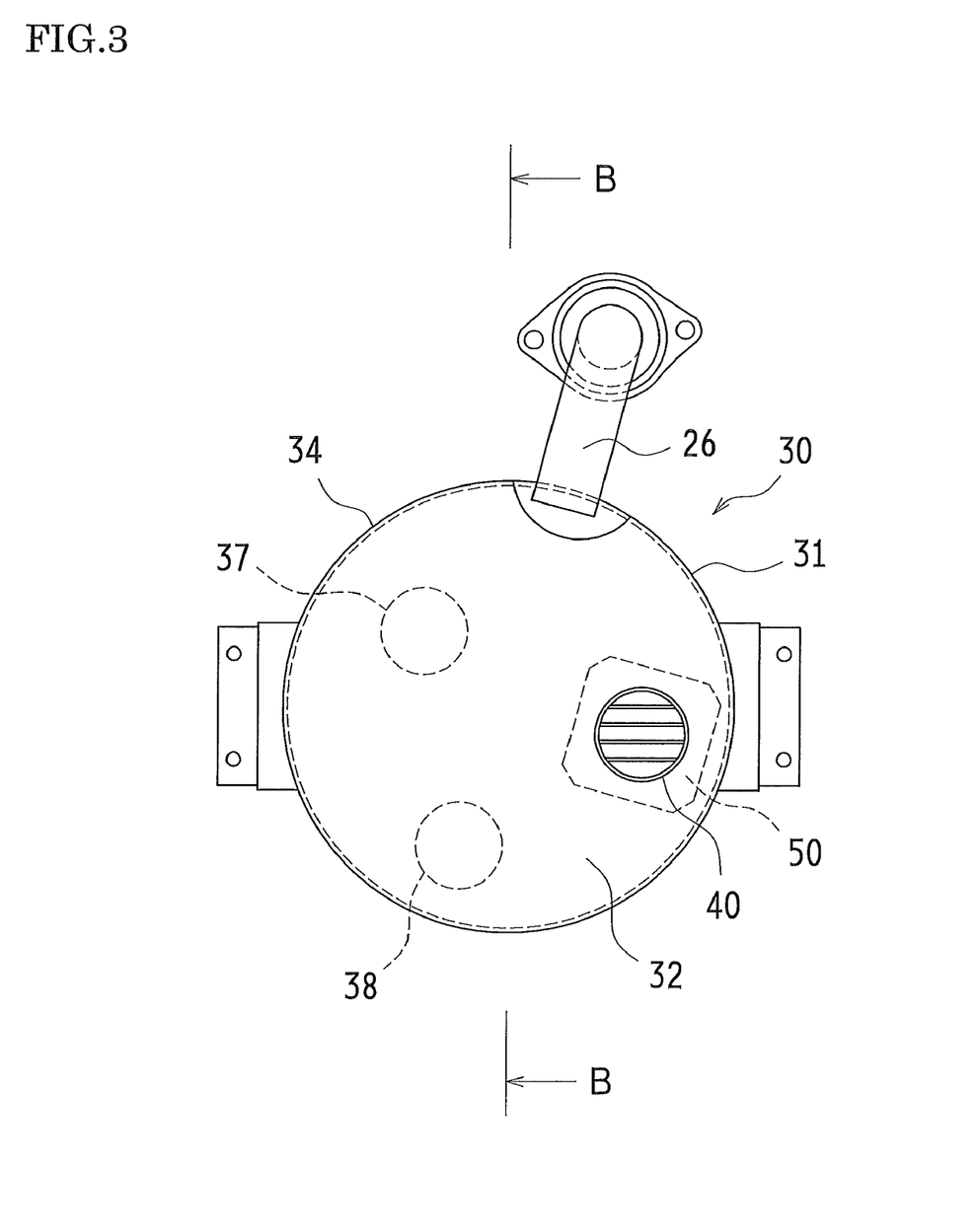
FIG. 3 is a plan view of the exhaust muffler.
Figure 4:
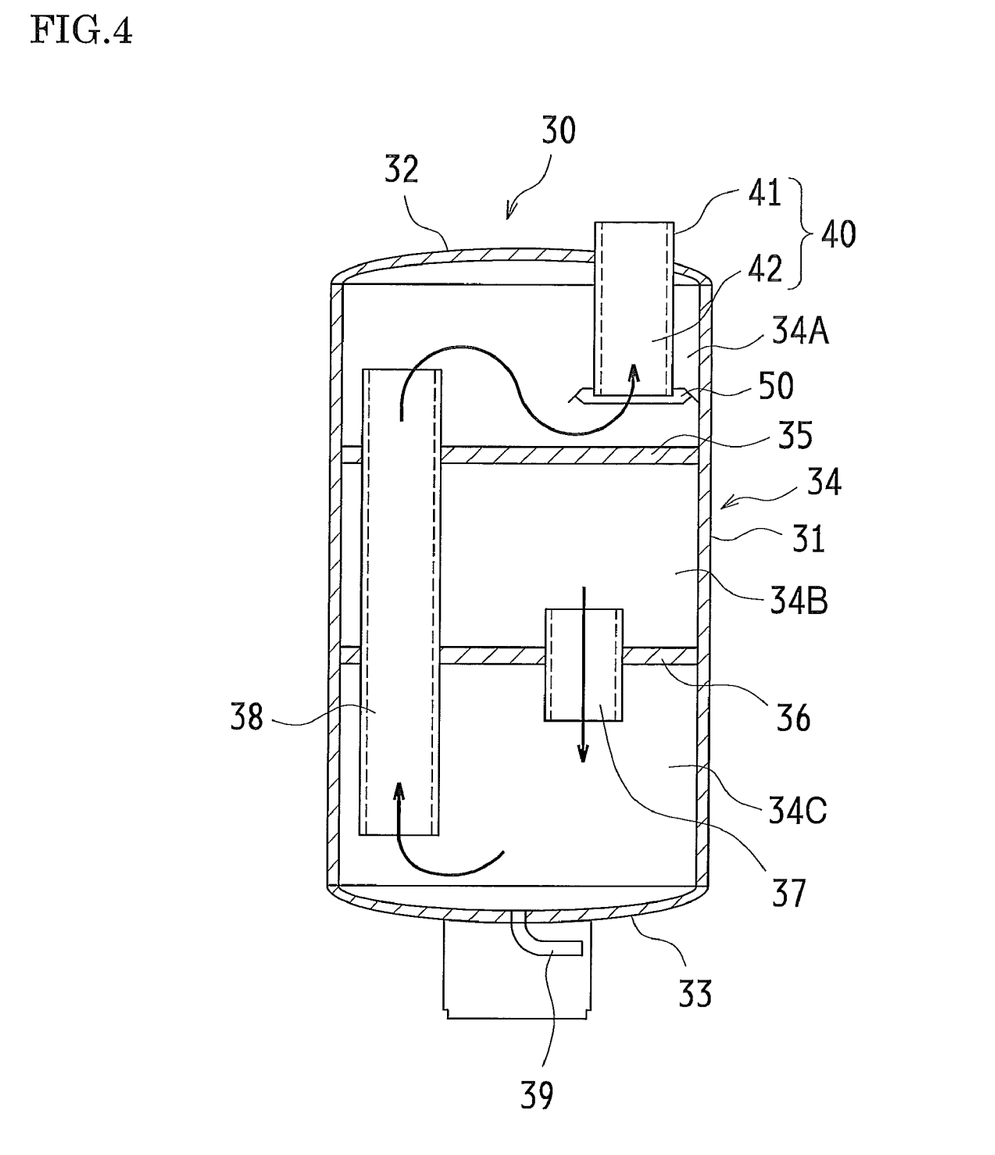
FIG. 4 is a cross-sectional view of the interior of the exhaust muffler.
Figure 5:
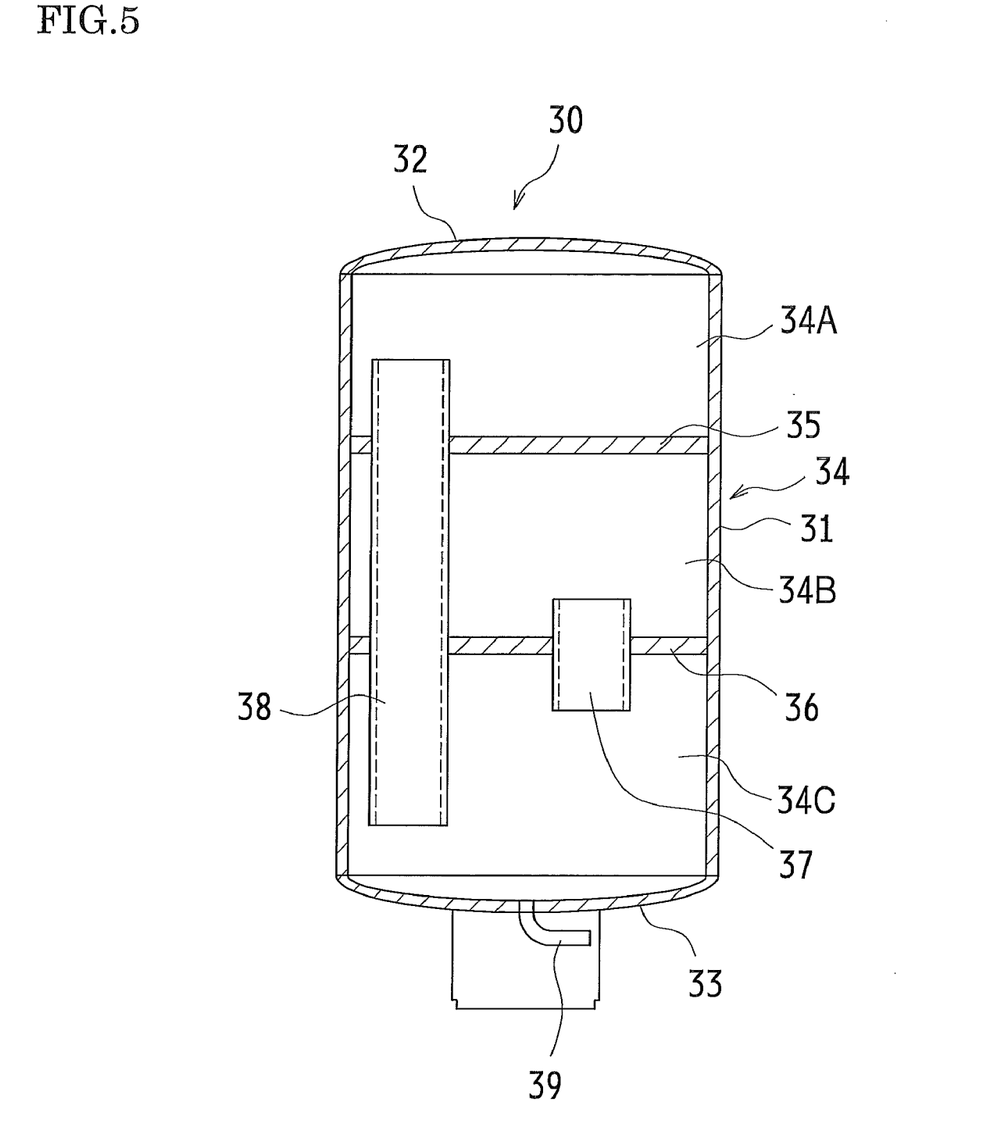
FIG. 5 is a cross-sectional view taken along line B-B indicated in FIG. 3.
Figure 6:
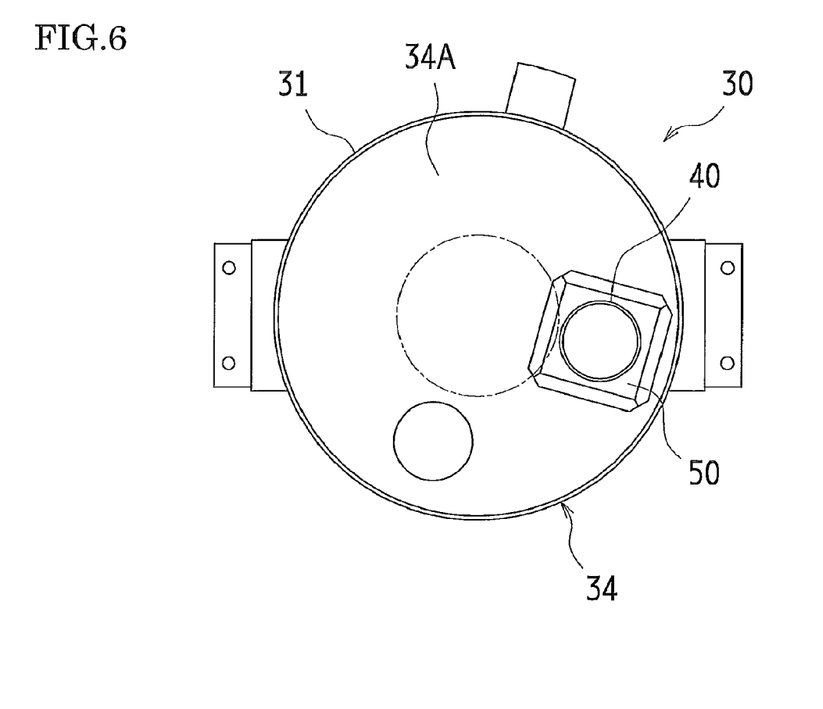
FIG. 6 is a cross-sectional view taken along line A-A indicated in FIG. 2.

FIGS. 2 to 6 represent the exhaust muffler 30 in accordance with the present embodiment: specifically, FIG. 2 is a front view of the exhaust muffler 30, FIG. 3 is a plan view of the exhaust muffler 30, FIG. 4 is a cross-sectional view of the interior of the exhaust muffler 30, FIG. 5 is a cross-sectional view taken along line B-B indicated in FIG. 3, and FIG. 6 is a cross-sectional view taken along line A-A indicated in FIG. 2.

The exhaust muffler 30 in accordance with the present embodiment has a gas-liquid separating function as well as a sound deadening function that reduces the noise generated by the exhaust gas. The exhaust muffler 30 is connected to the exhaust heat exchanger 13 via an exhaust tube 26. The exhaust muffler 30 includes a main body 34 composed of a substantially cylindrical peripheral wall 31 and top and bottom walls 32 and 33 closing up the top and bottom of the peripheral wall 31. The interior of the main body 34 is, as illustrated in FIG. 4, separated by a plurality of partition walls 35 and 36 into a plurality of stages including a top stage chamber 34A, a middle stage chamber 34B, and a bottom stage chamber 34C. The partition walls 35 and 36 have a plurality of pores (not shown) opened vertically therethrough to allow for condensed water to fall through the pores.

A distribution tube 37 runs vertically through the partition wall 36 that separates the middle stage chamber 34B and the bottom stage chamber 34C, so that the middle stage chamber 34B and the bottom stage chamber 34C can be spatially continuous via the distribution tube 37. A distribution tube 38 runs vertically through the partition wall 36 and the partition wall 35 that separates the middle stage chamber 34B and the top stage chamber 34A, so that the bottom stage chamber 34C and the top stage chamber 34A can be spatially continuous via the distribution tube 38.

Referring to FIGS. 1 and 2, the exhaust tube 26 connected to the exhaust heat exchanger 13 disposed on the exhaust discharge port side of the engine is connected, at a downstream end thereof, to the peripheral wall 31 so that the exhaust tube 26 can be spatially continuous with the middle stage chamber 34B. Therefore, the exhaust gas from the engine flows through the exhaust tube 26 and enters the middle stage chamber 34B.

The main body 34 has a top wall 32 through which there is provided and fixed a vertical exhaust outlet tube 40 that spatially connects the top stage chamber 34A to the outside. The exhaust outlet tube 40 includes a protrusion section 41 and an insertion section 42. The protrusion section 41 protrudes above the top wall 32. The insertion section 42 protrudes below the top wall 32, opening up to the top stage chamber 34A. The insertion section 42 has, at a lower end thereof, a brim portion 50 made from a metal or rigid resin plate.

Figure 7:
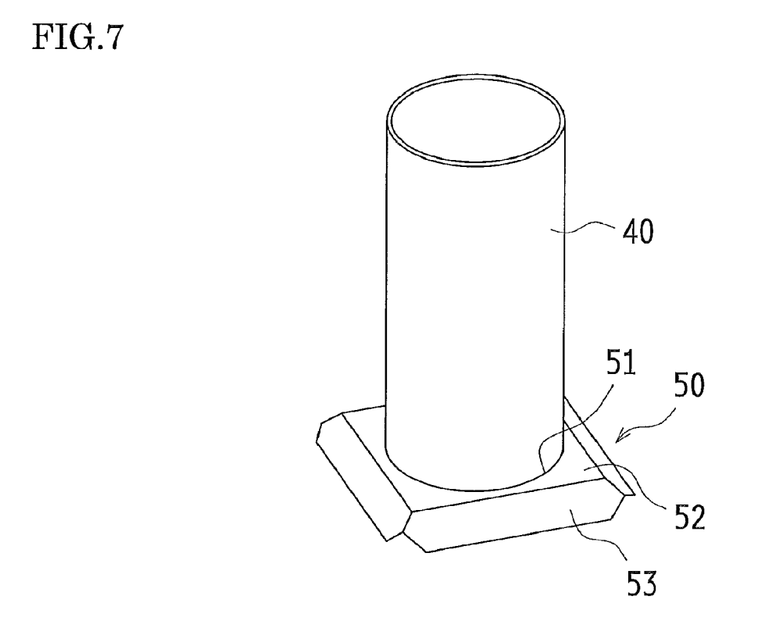
FIG. 7 is an oblique view of an exhaust outlet tube and a brim portion.
Figure 8:
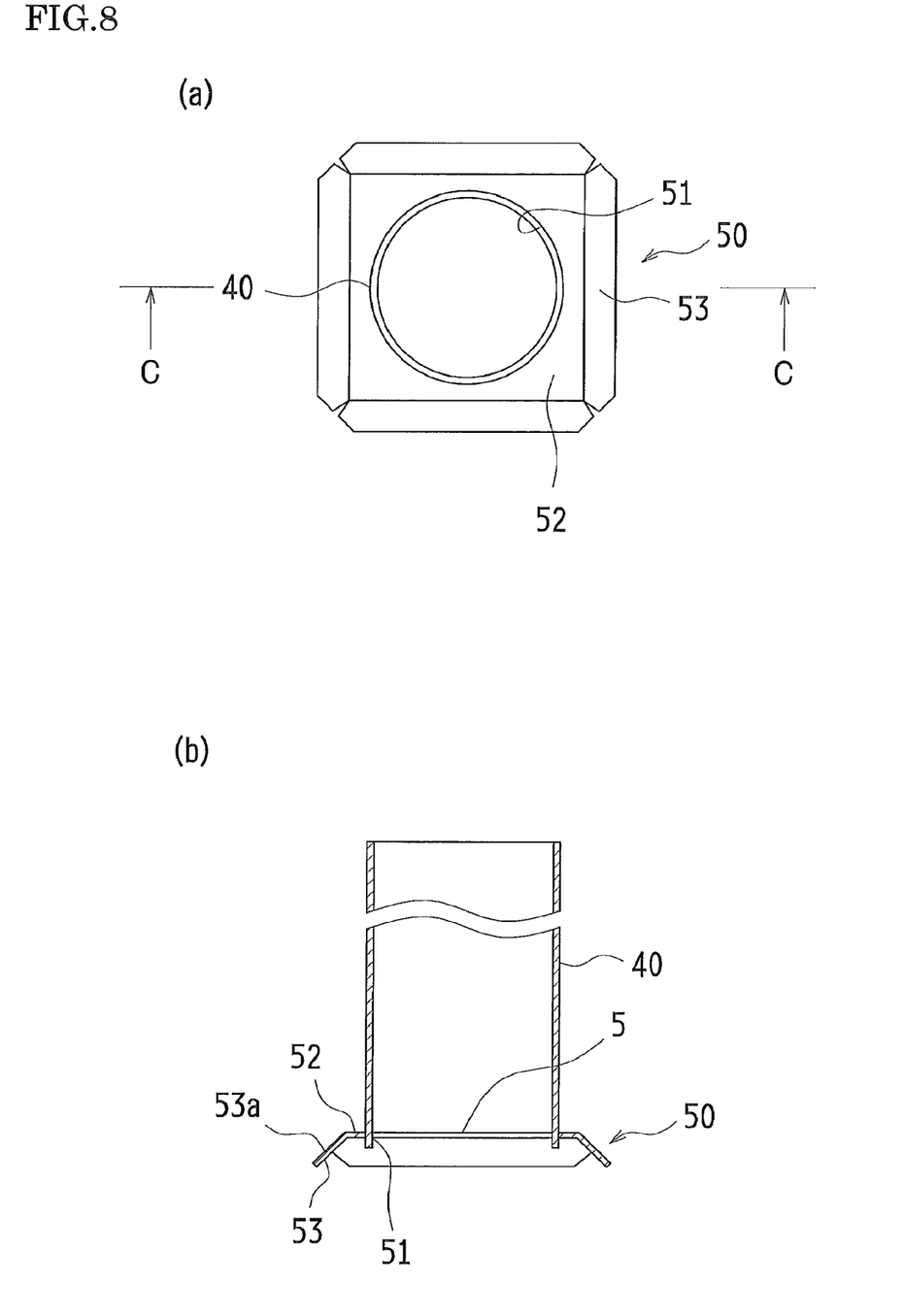
FIG. 8 represents the exhaust outlet tube and the brim portion, FIG. 8(a) being a plan view whereas FIG. 8(b) being a cross-sectional view taken along line C-C indicated in FIG. 8(a).

FIGS. 7 and 8 represent the exhaust outlet tube 40 and the brim portion 50. FIG. 7 is an oblique view of the exhaust outlet tube 40 and the brim portion 50. FIG. 8(*a*) is a plan view of the exhaust outlet tube 40 and the brim portion 50. FIG. 8(*b*) is a cross-sectional view taken along line C-C indicated in FIG. 8(*a*).

The brim portion 50 includes a regulation portion that radially spreads from the insertion section 42 of the exhaust outlet tube 40. The brim portion 50 is, for example, rectangular in a plan view and includes a fixed portion 52 and an inclined portion 53. The fixed portion 52 has an opening 51 in which a lower end (open end) of the insertion section 42 is inserted. The inclined portion 53 extends downward from the four sides of the fixed portion 52. The inclined portion 53 has inclined planes 53*a* on upper faces thereof. In this manner, the brim portion 50 is disposed at the open end of the exhaust outlet tube 40 all along the entire circumference of the exhaust outlet tube 40 and spreads beyond the diameter of the exhaust outlet tube 40.

The brim portion 50 may be disposed at the open end of the insertion section 42 so that the insertion section 42 has a lower end face either at the same height as the lower face of the fixed portion 52 of the brim portion 50 or slightly above or below that lower face.

The bottom wall 33 of the main body 34 is connected to a drain water filter (not shown) via the drain tube 39.

The cogenerator 1 in accordance with the present embodiment is arranged as described above. Next will be described the operation of the cogenerator 1.

Fuel gas is supplied to the mixer connected to the engine 10. The air sucked into the intake air chamber 8A is supplied to the mixer via the air cleaner 22 and the intake air silencer 23. The fuel gas, after being mixed with air in the mixer, is supplied to the engine 10. The fuel gas powers the engine 10 which in turn powers the electric power generator 11 to generate electric power. The generated electric power is supplied to an external electric power load.

The heat collected by the engine cooling water as it cools down the engine 10 is discarded outside via the water-to-water heat exchanger. The engine cooling water, after passing through the water-to-water heat exchanger, returns to the engine 10.

The exhaust gas from the engine 10 passes through the exhaust heat exchanger 13 and then enters the middle stage chamber 34B in the exhaust muffler 30 via the exhaust tube 26. The exhaust gas in the middle stage chamber 34B enters the bottom stage chamber 34C via the distribution tube 37. The exhaust gas, after entering the bottom stage chamber 34C, enters the top stage chamber 34A via the distribution tube 38. After entering the top stage chamber 34A, the exhaust gas is discharged outside via the exhaust outlet tube 40. In this manner, the exhaust gas is discharged outside via the exhaust outlet tube 40 after hitting the interior of the main body 34 and the partition walls 35 and 36 in the exhaust muffler 30. The noise generated by the exhaust gas is reduced because the exhaust gas passes through the exhaust muffler 30.

Condensed water in the exhaust gas collects on the inner wall faces of the main body 34 in the form of water droplets and falls downward due to their own weight. The condensed water, having fallen onto the partition walls 35 and 36, flows downward through the pores in the partition walls 35 and 36 and is recovered in the drain filter via the drain tube 39.

The condensed water may in some cases collect on the outer face of the insertion section 42 of the exhaust outlet tube 40. In those cases, the condensed water collecting on the outer face of the exhaust outlet tube 40 runs downward on the outer face of the insertion section 42 of the exhaust outlet tube 40. The condensed water, having run down to the lower end of the insertion section 42, is received by the fixed portion 52 of the brim portion 50 and then flows on the inclined planes 53*a* of the inclined portion 53 before falling off. In this manner, the condensed water collecting on the outer face of the exhaust outlet tube 40 leaves the open end of the insertion section 42 before falling off. This structure prevents the condensed water from being sucked into the exhaust outlet tube 40 together with the exhaust gas.

The gas duct of the exhaust system is generally cool when the cogenerator 1 is restarted after a predetermined time of suspension of its operation. Immediately after the operation is resumed, the water content of the exhaust gas could condense in the cool gas duct of the exhaust system and collect on the outer face of the insertion section 42 of the exhaust outlet tube 40. The brim portion 50 prevents that water content from causing a potential problem because the brim portion 50 causes the condensed water collecting on the outer face of the insertion section 42 to fall off without being sucked up by the exhaust gas. Hence, the exhaust muffler 30 can exhibit a sufficient gas-liquid separating function.

The exhaust gas heats up the exhaust muffler 30 by passing through the exhaust muffler 30. However, the exhaust muffler 30, being located in the exhaust gas chamber 8B, is isolated from the air cleaner 22 and the intake air silencer 23. This structure prevents engine exhaust heat from being transmitted to the air cleaner 22 and the intake air silencer 23.

According to the present embodiment, the exhaust muffler 30 is disposed at an end of the path in an exhaust system. The exhaust muffler 30 has an exhaust sound deadening function and a gas-liquid separating function, which renders unnecessary the conventional mist separator with a gas-liquid separating function. This advantageously allows for reduction in required internal space and also reduction in the number of components in comparison to cases where the exhaust muffler 30 and the mist separator are provided separately.

Figure 9:
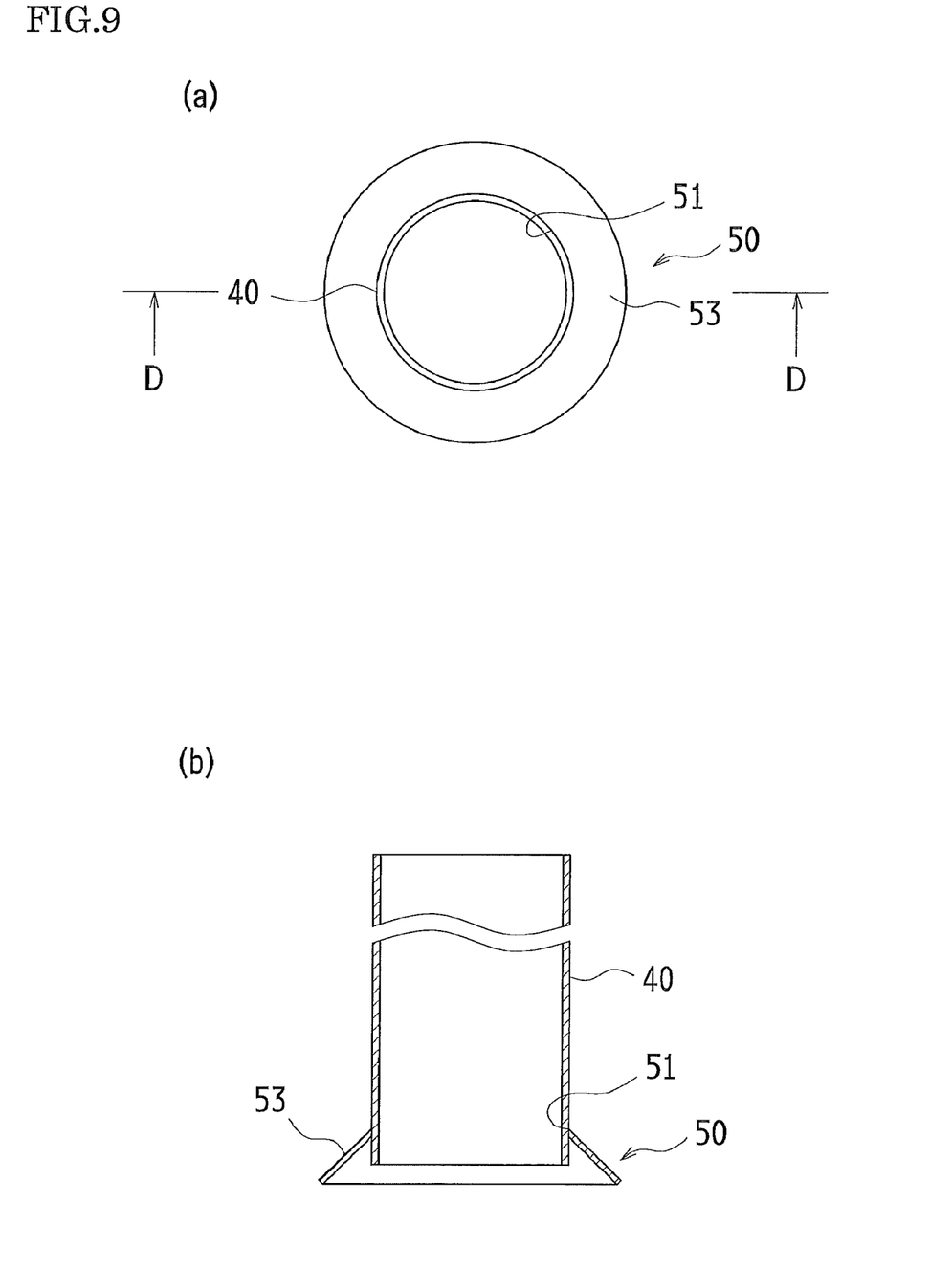
FIG. 9 represents the exhaust outlet tube and the brim portion, FIG. 9(a) being a plan view whereas FIG. 9(b) being a cross-sectional view taken along line D-D indicated in FIG. 9(a).

FIG. 9 represents another embodiment of the present invention. FIG. 9(a) is a plan view of an exhaust outlet tube 40 and a brim portion 50, and FIG. 9(b) is their cross-sectional view taken along line D-D indicated in FIG. 9(a).

The brim portion 50 in accordance with the present embodiment is shaped substantially like a circular truncated cone. The members in the present embodiment that are the same as those in the previous embodiment are indicated by the same reference numerals and description thereof is omitted.

The present invention is by no means limited to the embodiment detailed above. For example, the protrusion section 41 and the insertion section 42 of the exhaust outlet tube 40 may each have any length. The protrusion section 41 is not necessarily provided.

The embodiment described above uses the exhaust muffler 30 as an example of the engine-exhaust-system apparatus. The engine-exhaust-system apparatus may be used as a gas-liquid separator, not as the exhaust muffler 30. The present invention is applicable to an engine-driven heat pump that includes, for example, engine-system devices and cooling-medium-circuit devices.

The present invention may be implemented in various forms without departing from its spirit and main features. Therefore, the aforementioned examples are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

The present application hereby claims priority on Japanese Patent Application, Tokugan, No. 2013-058230 filed Mar. 21, 2013 in Japan, the entire contents of which are hereby incorporated herein by reference.

INDUSTRIAL APPLICABILITY

The present invention is applicable in uses that indispensably require, in addition to a sound deadening function, a gas-liquid separating function of preventing water content condensing on the outer face of the insertion section of an exhaust outlet tube from being sucked into the exhaust outlet tube together with exhaust gas. The present invention is useful when it is applied to, for example, an engine-exhaust-system apparatus disposed on the exhaust path of a stationary engine or a package-type engine electric power generator.

REFERENCE SIGNS LIST

1 Cogenerator
2 Package
10 Engine
11 Electric Power Generator
30 Exhaust Muffler (Engine-exhaust-system Apparatus)
31 Peripheral Wall
32 Top Wall
33 Bottom Wall
34 Main Body
34A Top Stage Chamber
34B Middle Stage Chamber
34C Bottom Stage Chamber
35,36 Partition Wall
37 Distribution Tube
38 Distribution Tube
39 Drain Tube
40 Exhaust Outlet Tube
41 Protrusion Section
42 Insertion Section
50 Brim Portion
51 Opening
52 Fixed Portion
53 Inclined Portion

The invention claimed is:

1. An engine-exhaust-system apparatus, comprising:
a main body that reduces noise generated by exhaust gas; and
an exhaust outlet tube that includes an insertion section inserted into the main body,
the exhaust gas in the main body being discharged outside via the exhaust outlet tube,
wherein the main body is internally separated by a partition wall into an exhaust outlet chamber where the exhaust outlet tube is disposed and an exhaust inlet chamber where an exhaust tube is disposed that connects the main body to an exhaust discharge port side of an engine,
a distribution tube, which spatially connects the exhaust outlet chamber and the exhaust inlet chamber, is disposed in the main body,
the exhaust outlet tube is disposed parallel to an axis of the distribution tube and displaced radially relative to the distribution tube, and
a brim portion that spreads beyond a tube diameter of the insertion section is mounted on a peripheral wall of the exhaust outlet tube around an open end of the insertion section,
the brim portion projects from the peripheral wall of the exhaust outlet tube at a position displaced from an inlet end face of the exhaust outlet tube toward an outlet end face of the exhaust outlet tube, and extends upstream in an exhaust gas flowing direction beyond the inlet end face of the exhaust outlet tube, and
an open end face of the brim portion has a greater diameter than an outer peripheral diameter of the exhaust outlet tube.

2. A package-type engine electric power generator, comprising an engine and an electric power generator in a single package and further comprising the engine-exhaust-system apparatus set forth in claim 1.

* * * * *